(12) United States Patent
Rajadurai

(10) Patent No.: US 11,778,471 B2
(45) Date of Patent: Oct. 3, 2023

(54) METHOD AND SYSTEM FOR INTEGRITY PROTECTION OF USER PLANE SIGNALING MESSAGES IN WIRELESS NETWORK

(71) Applicant: Samsung Electronics Co., Ltd., Suwon-si (KR)

(72) Inventor: Rajavelsamy Rajadurai, Bangalore (IN)

(73) Assignee: Samsung Electronics Co., Ltd., Suwon-si (KR)

(*) Notice: Subject to any disclaimer, the term of this patent is extended or adjusted under 35 U.S.C. 154(b) by 59 days.

(21) Appl. No.: 17/250,574

(22) PCT Filed: Aug. 2, 2019

(86) PCT No.: PCT/KR2019/009691
§ 371 (c)(1),
(2) Date: Feb. 3, 2021

(87) PCT Pub. No.: WO2020/027632
PCT Pub. Date: Feb. 6, 2020

(65) Prior Publication Data
US 2021/0176640 A1    Jun. 10, 2021

(30) Foreign Application Priority Data

Aug. 3, 2018  (IN) .............................. 201841029339
Aug. 2, 2019  (IN) .............................. 201841029339

(51) Int. Cl.
*H04W 12/106* (2021.01)
*H04W 76/12* (2018.01)

(52) U.S. Cl.
CPC ......... *H04W 12/106* (2021.01); *H04W 76/12* (2018.02)

(58) Field of Classification Search
CPC ....... H04W 8/08; H04W 8/24; H04W 12/106; H04W 12/02; H04W 12/033;
(Continued)

(56) References Cited

U.S. PATENT DOCUMENTS

2018/0219833 A1* 8/2018 Reddy ................. H04L 61/4511
2018/0316690 A1   11/2018 Cho et al.
(Continued)

FOREIGN PATENT DOCUMENTS

WO   2016208950 A1   12/2016
WO   2018008980 A1   1/2018

OTHER PUBLICATIONS

Examination report dated Apr. 12, 2021 in connection with Indian Application No. 201841029339, 7 pages.
(Continued)

*Primary Examiner* — Quoc Thai N Vu

(57) ABSTRACT

The disclosure relates to a pre-5th-Generation (5G) or 5G communication system to be provided for supporting higher data rates Beyond 4th-Generation (4G) communication system such as long term evolution (LTE). Accordingly, embodiments herein provide a method for integrity protection of user plane (UP) signaling messages in a wireless network. The method includes receiving integrity protection data rate capability of a user equipment (UE) (300). Further, the method includes receiving a dedicated protocol data unit (PDU) session establishment request to establish the dedicated PDU session for exchange of the UP signalling messages. Further, the method includes establishing the dedicated PDU session with integrity protection based on the integrity protection data rate capability of the UE (300). Further, the method includes exchanging the UP signalling message with the UE (300) over the established dedicated PDU session with integrity protection.

9 Claims, 9 Drawing Sheets

(58) Field of Classification Search
CPC ... H04W 12/03; H04W 12/08; H04W 12/086; H04W 12/088; H04W 48/16; H04W 60/00; H04W 76/10; H04W 76/12; H04W 76/25; H04W 92/10; H04L 63/20; H04L 63/205; H04L 63/123; G06F 21/64
See application file for complete search history.

(56) References Cited

U.S. PATENT DOCUMENTS

| | | | |
|---|---|---|---|
| 2019/0364541 A1 | 11/2019 | Ryu | |
| 2019/0394651 A1* | 12/2019 | Wifvesson | H04W 12/10 |
| 2020/0322804 A1* | 10/2020 | Vutukuri | H04W 36/0038 |

OTHER PUBLICATIONS

International Search Report and Written Opinion of the International Searching Authority in connection with International Application No. PCT/KR2019/009691 dated Nov. 28, 2019, 10 pages.

3GPP TS 23.501 V15.2.0 (Jun. 2018), Technical Specification, 3rd Generation Partnership Project; Technical Specification Group Services and System Aspects; System Architecture for the 5G System; Stage 2 (Release 15), Jun. 2018, 217 pages.

Huawei, et al., "Activation/deactivation of the DRB integrity protection," R2-1800474, 3GPP TSG-RAN2 NR Ad hoc 0118, Vancouver, Canada, Jan. 22-26, 2018, 4 pages.

Huawei, et al., "UP security policy determination and transmission procedure," S3-180175, revision of S3-18xabc, 3GPP TSG SA WG3 (Security) Meeting #90, Jan. 22-26, 2018, Gothenburg, Sweden, 3 pages.

Supplementary European Search Report dated Jul. 13, 2021, in connection with European Patent Application No. EP19845249.2, 10 pages.

ZTE Corp. et al., "Framework for DRB integrity protection", 3GPP TSG-RAN WG2 Meeting #101, R2-1802049 (resubmission of R2-1800466) Athens, Greece, Feb. 26-Mar. 2, 2018, 3 pages.

ZTE, "Guarantee the UE Max Data Rate for Integrity Protection", 3GPP TSG-RAN WG3 #99bis, R3-181691, Sanya, China, Apr. 16-20, 2018, 7 pages.

Communication pursuant to Article 94(3) EPC dated Sep. 22, 2022, in connection with European Patent Application No. 19845249.2, 4 pages.

\* cited by examiner

[Fig. 1]
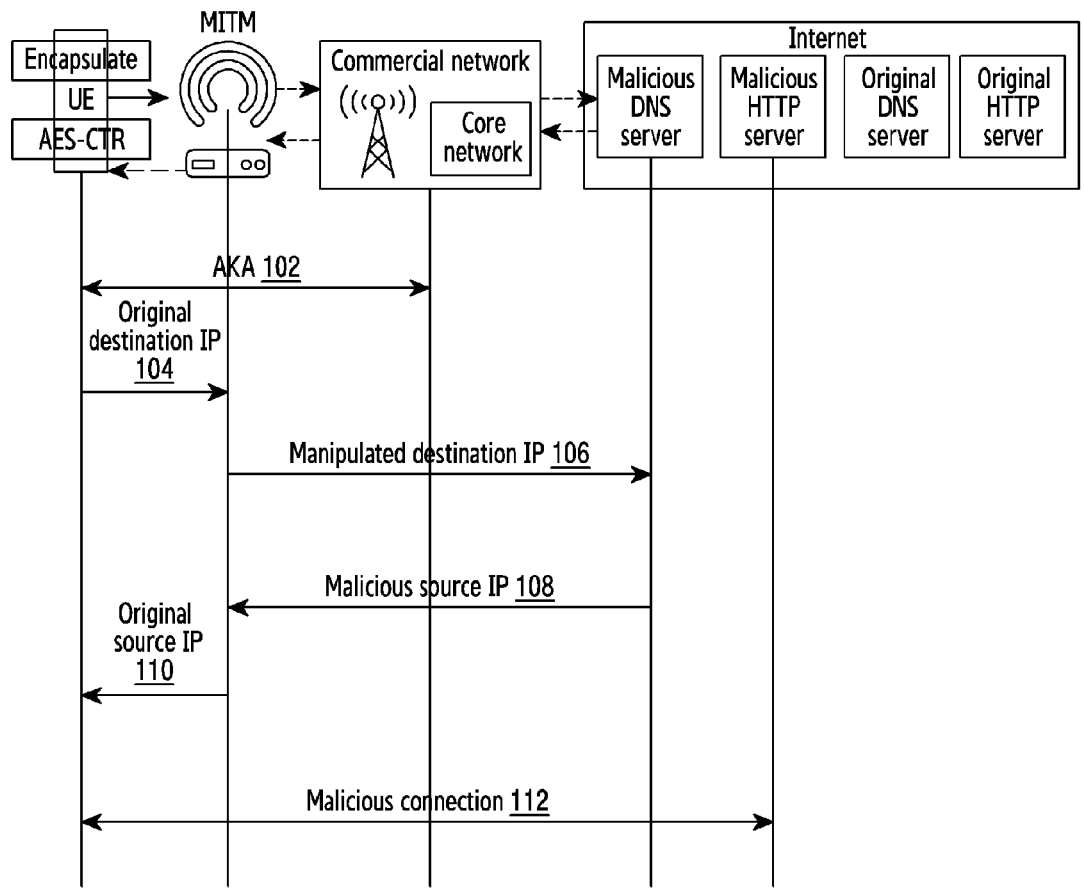
[Fig. 2A]
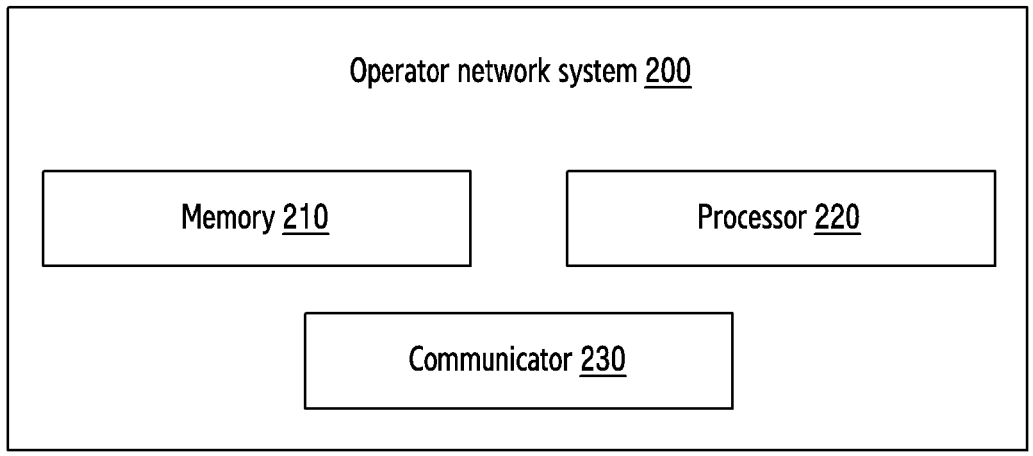

[Fig. 2B]
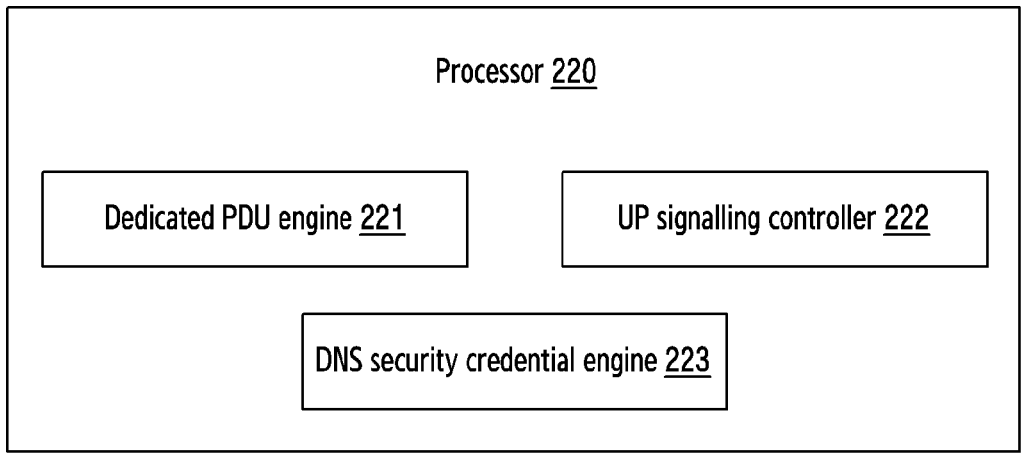
[Fig. 3A]
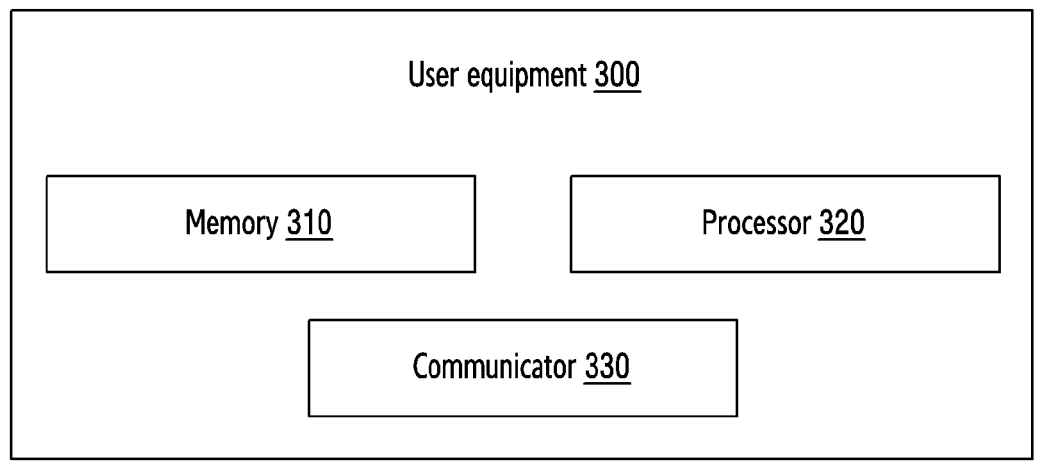
[Fig. 3B]
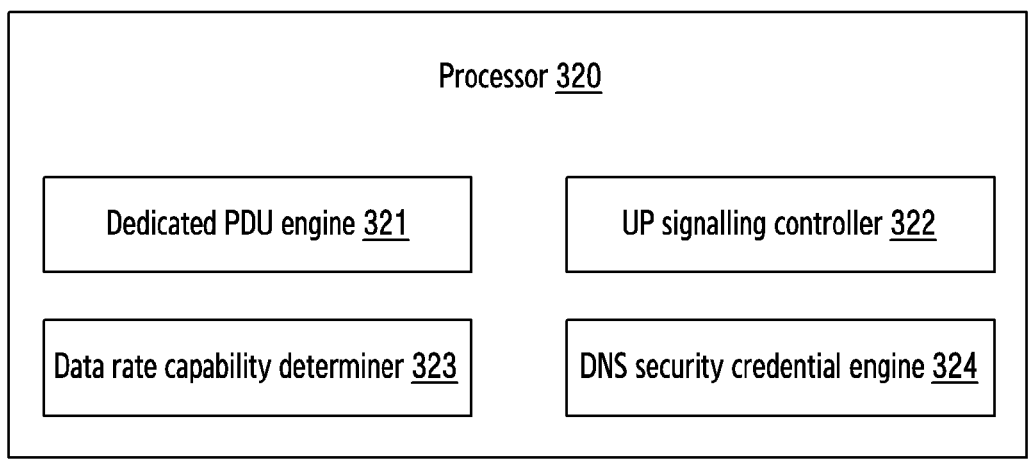

[Fig. 4A]
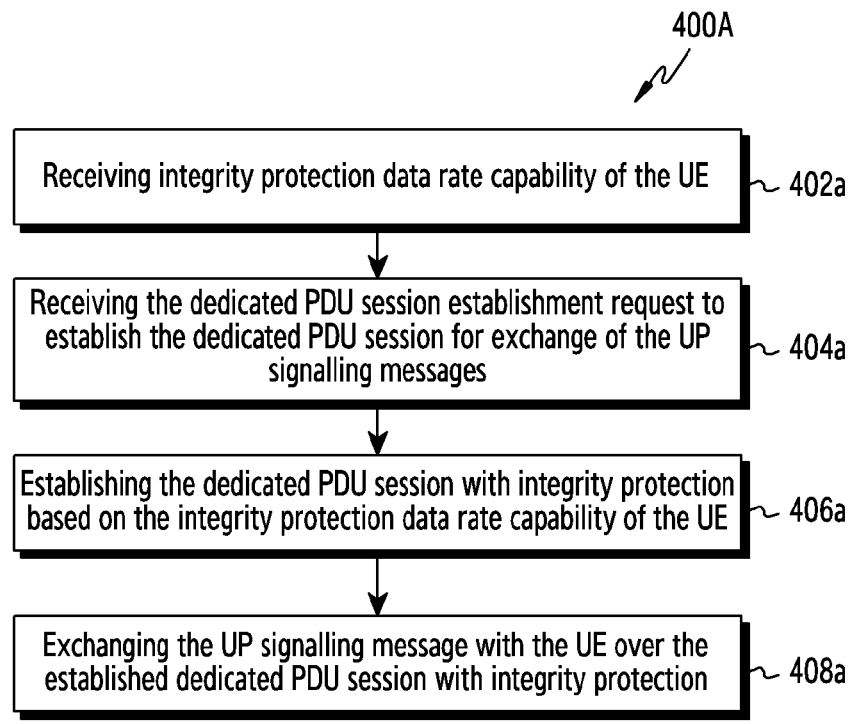
[Fig. 4B]
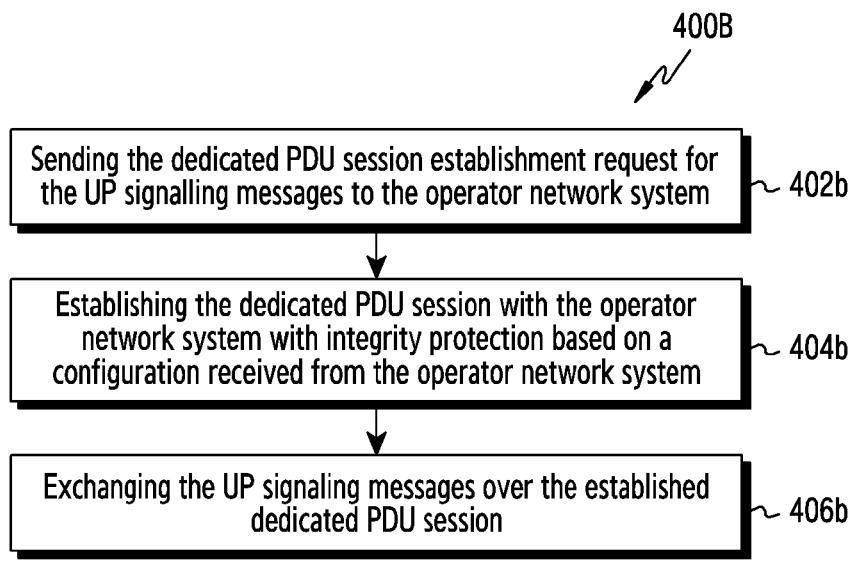

[Fig. 4C]
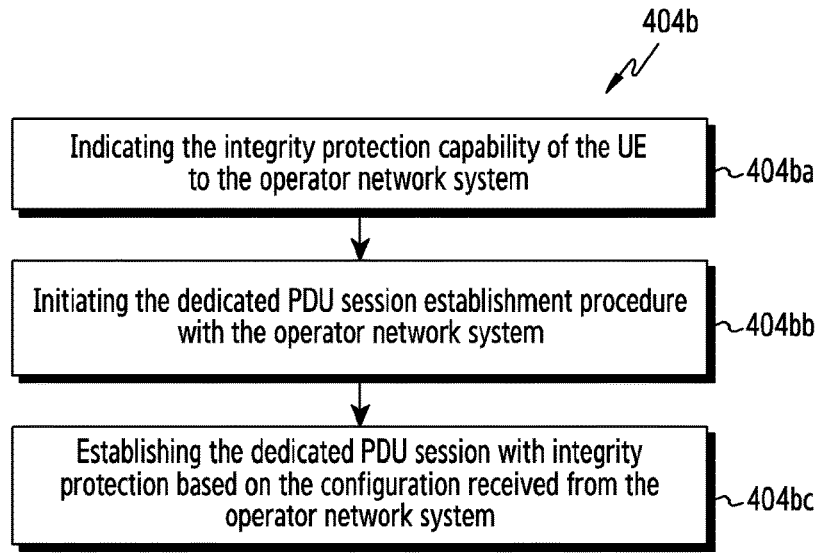
[Fig. 4D]
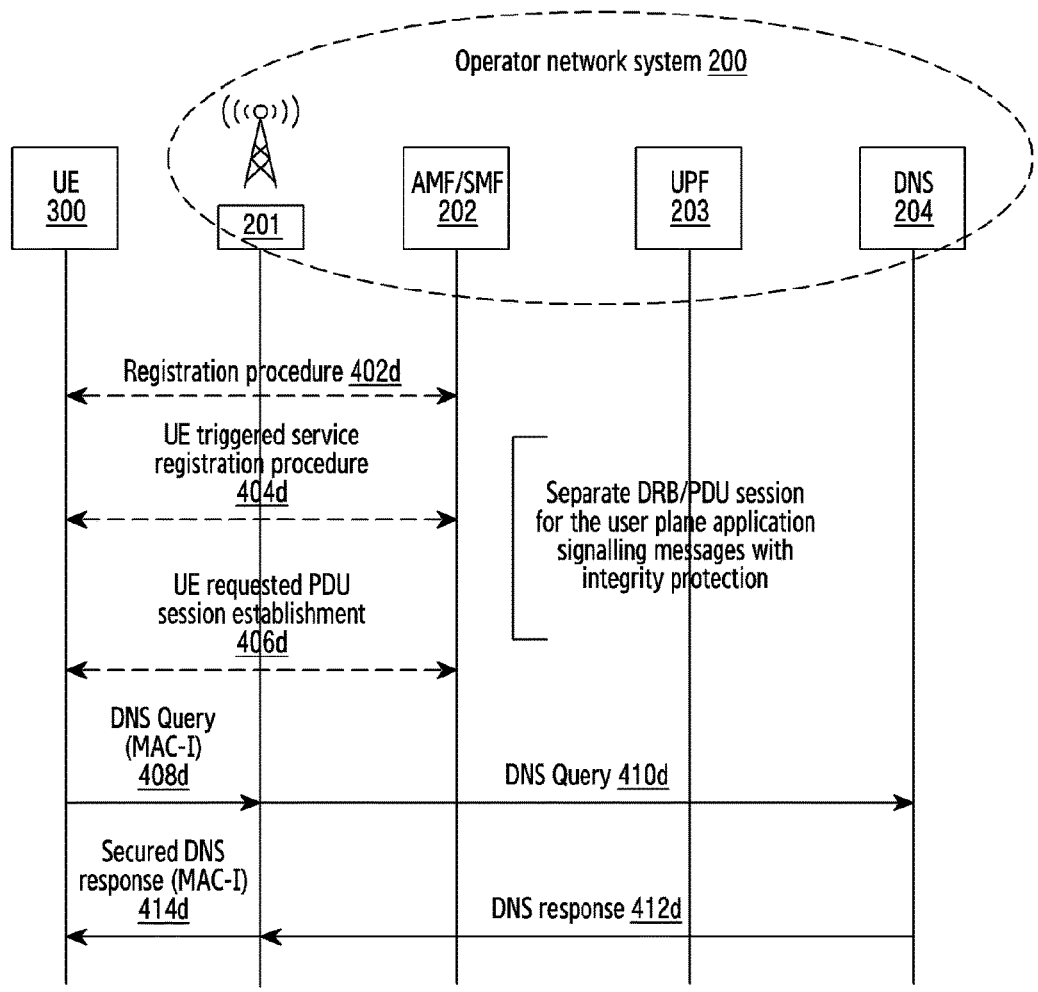

[Fig. 4E]
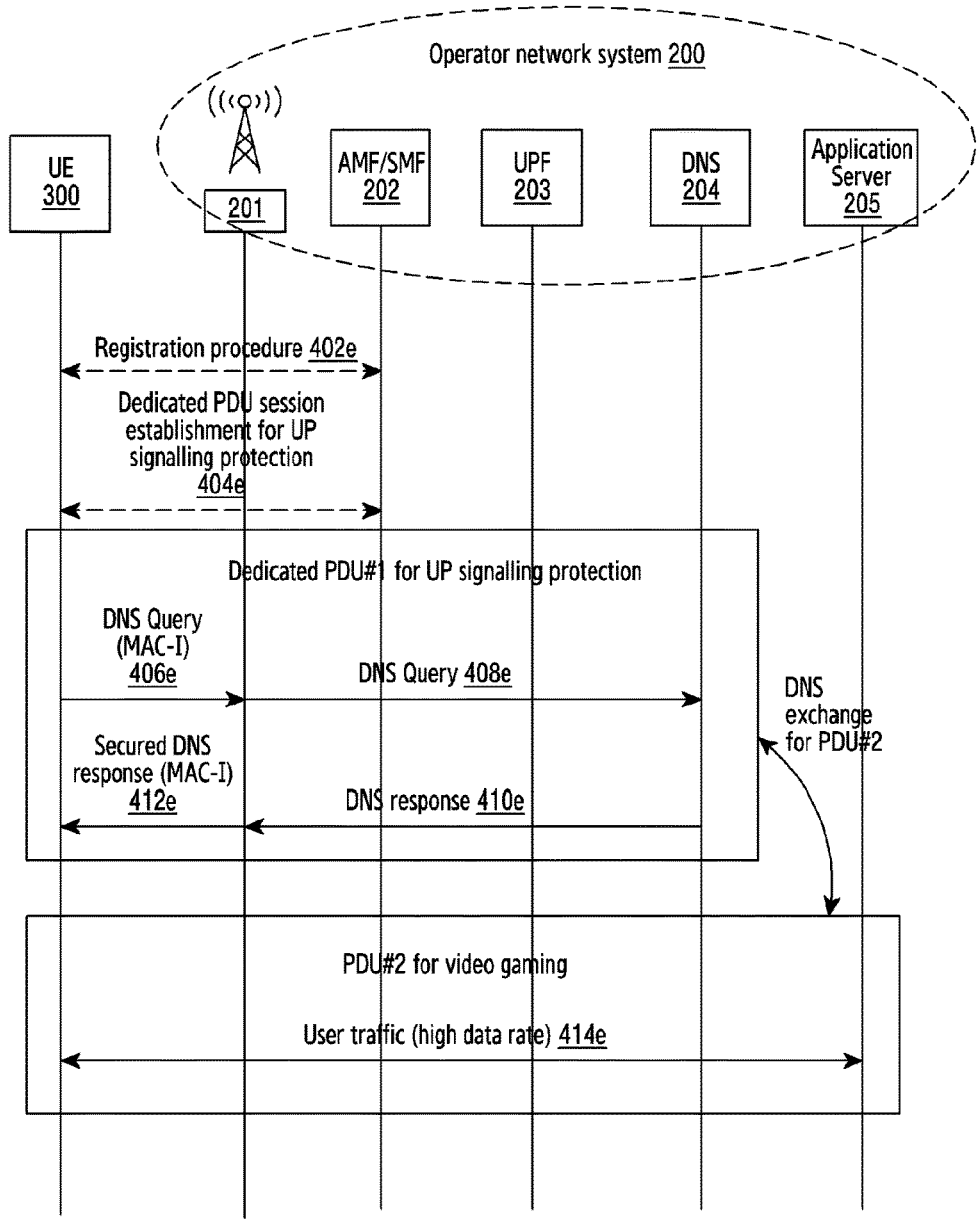
[Fig. 5A]
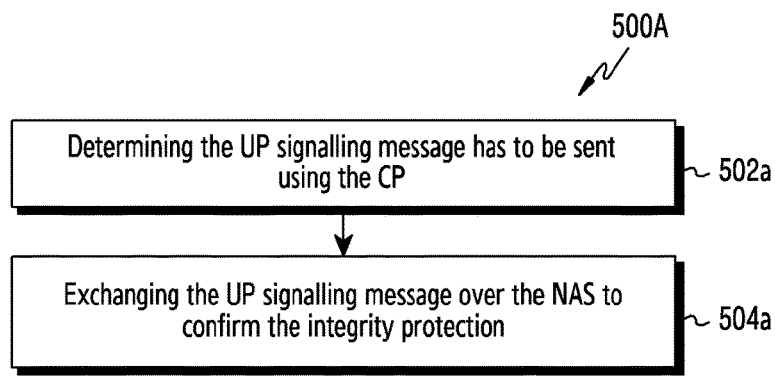

[Fig. 5B]
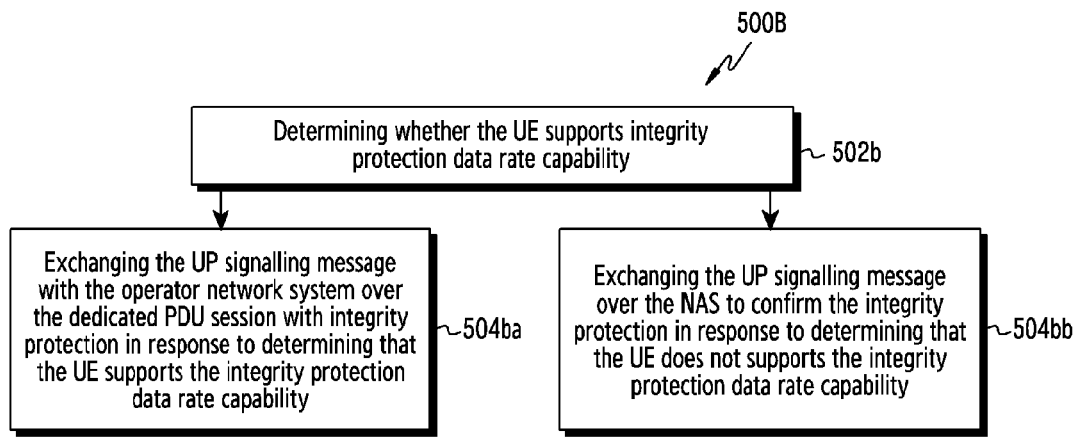
[Fig. 5C]
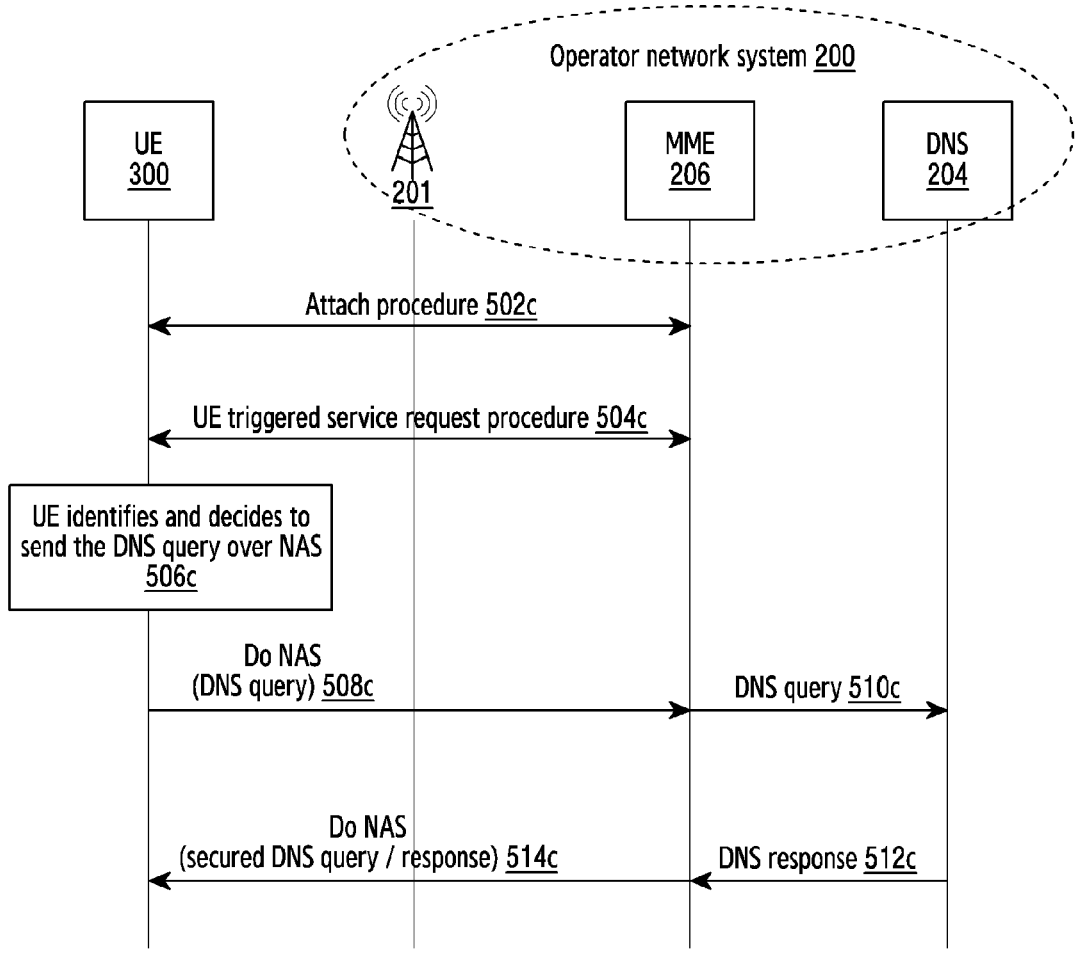

[Fig. 6A]
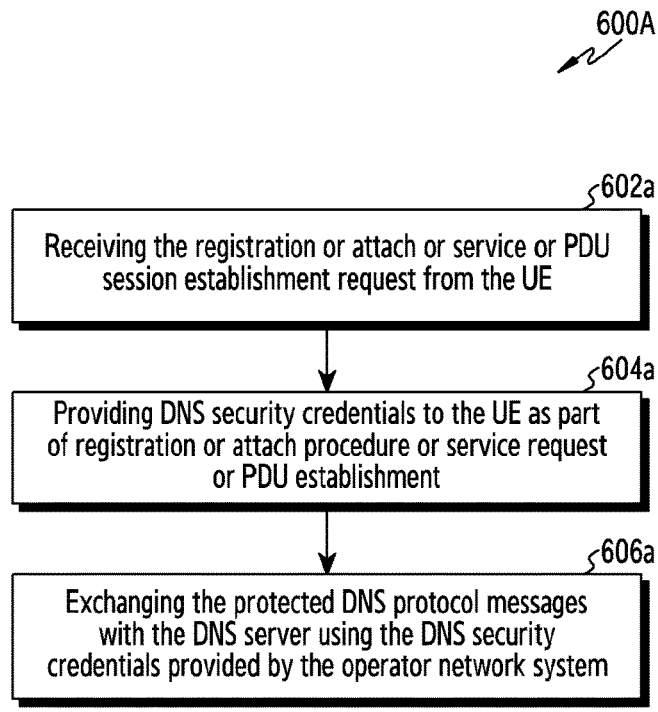
[Fig. 6B]
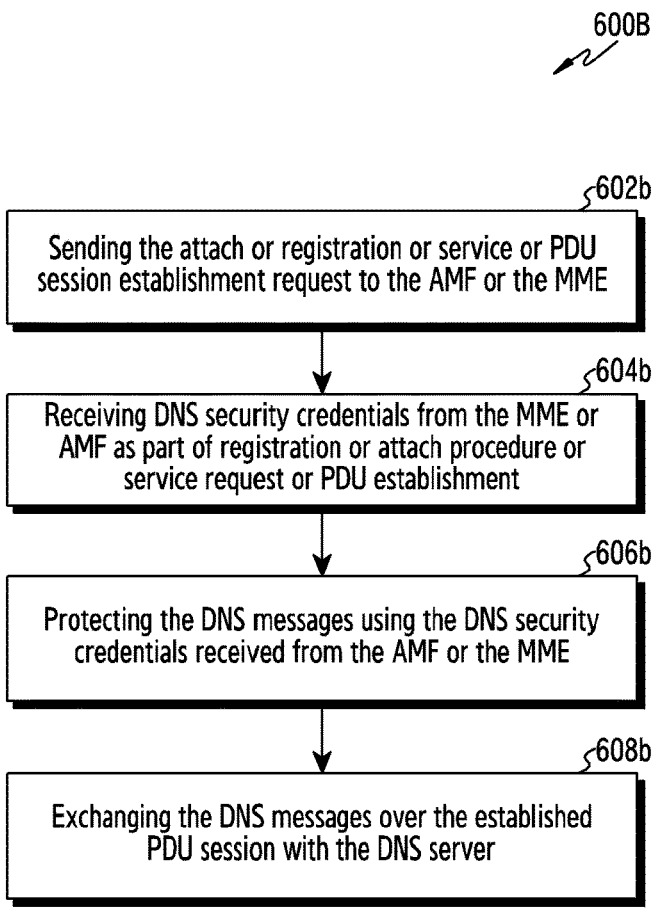

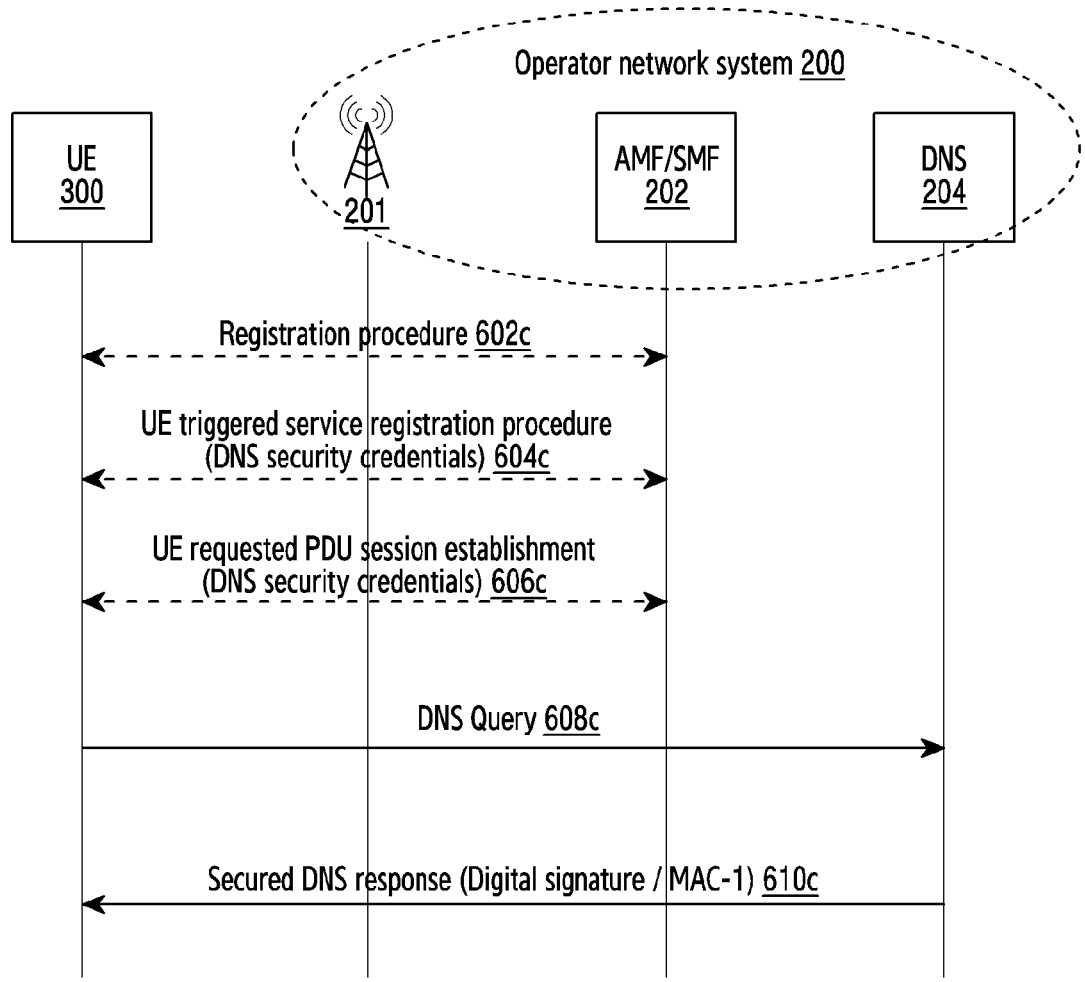

[Fig. 7]
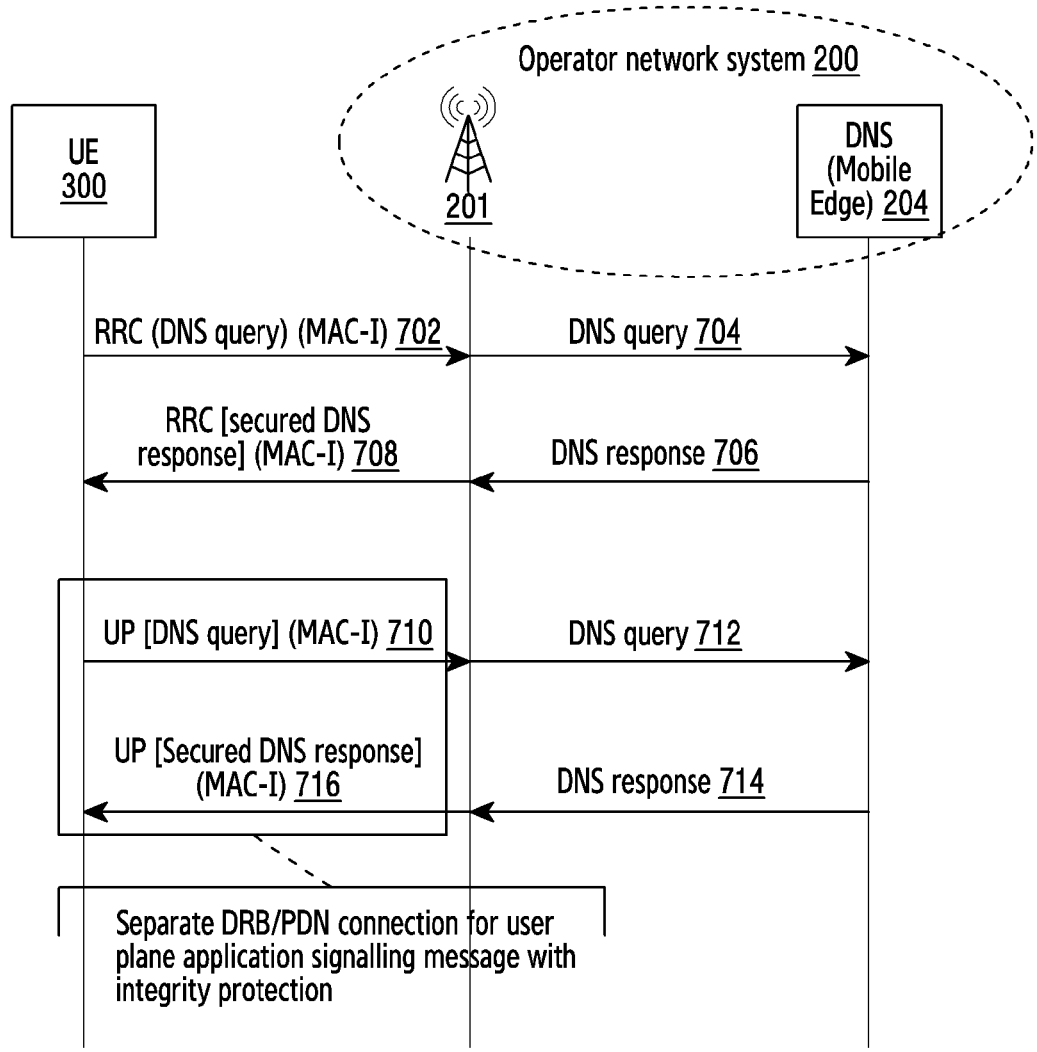

METHOD AND SYSTEM FOR INTEGRITY PROTECTION OF USER PLANE SIGNALING MESSAGES IN WIRELESS NETWORK

CROSS-REFERENCE TO RELATED APPLICATIONS

This application is a 371 National Stage of International Application No. PCT/KR2019/009691, filed Aug. 2, 2019, which claims priority to Indian Patent Application No. 201841029339, filed Aug. 3, 2018, Indian Patent Application No. 201841029339, filed Aug. 2, 2019, and the disclosures of which are herein incorporated by reference in their entirety.

BACKGROUND

1. Field

The present method relates to security of user plane signaling messages and more particularly to a method and system for integrity protection of user plane signaling messages in a wireless network.

2. Description of Related Art

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

In general, in absence of an integrity protection for a long-term evolution data radio bearers (LTE DRBs) (user plane) or disabling the integrity protection for fifth-generation packet data unit (5G PDU) sessions (to reduce an overhead) unwraps security attack like manipulation of an encrypted text by a Man in the Middle (MITM) between a user equipment (UE) and an evolved node B/a next-generation radio access technology network (eNB/gNB). Manipulation of the encrypted text is a serious threat particularly for signaling messages leading to redirection attacks. For example, redirection of a domain name system (DNS) query message. Further, the attack can be performed by manipulation of a DNS server internet protocol (IP) address of a DNS request message from the UE so that the DNS request is redirected to a malicious DNS server under an attacker's control rather than intended destination. Therefore, it is required to the integrity protection the signaling messages over the user plane.

SUMMARY

The principal object of the embodiments herein is to provide a method and system for integrity protection of user plane signaling messages in a wireless network.

Another object of the invention herein is to receive integrity protection data rate capability of a user equipment (UE).

Another object of the invention herein is to receive a dedicated protocol data unit (PDU) session establishment request to establish the dedicated PDU session for exchange of user plane (UP) signalling messages.

Another object of the invention herein is to establish the dedicated PDU session with integrity protection based on an integrity protection maximum data rate capability of the UE.

Another object of the invention herein is to exchange the UP signalling message with the UE over the established dedicated PDU session.

Another object of the invention herein is to send the dedicated PDU session establishment request for the UP signalling messages to an operator network system.

Another object of the invention herein is to establish the dedicated PDU session with the operator network system with integrity protection based on the configuration received from the operator network system.

Another object of the invention herein is to exchange the UP signalling message with the operator network system over the established dedicated PDU session with integrity protection.

Another object of the invention herein is to indicate the integrity protection capability of the UE to the operator network system and initiate the dedicated PDU session establishment procedure with the operator network system.

Another object of the invention herein is to determine the UP signalling message has to be sent using a control plane (CP), and exchange the UP signalling message over a non-access-stratum (NAS) to confirm the integrity protection.

Another object of the invention herein is to determine whether the UE supports integrity protection data rate capability and perform one of exchange the UP signalling message with the operator network system over the dedicated PDU session with integrity protection in response to determining that the UE supports the integrity protection data rate capability and exchange the UP signalling message over the NAS to confirm the integrity protection in response to determining that the UE does not supports the integrity protection data rate capability.

Another object of the invention herein is to send an attach or registration request to an access and mobility management function (AMF) or a mobility management entity (MME), receive domain name system (DNS) security credentials from the MME or AMF as part of registration or attach procedure, protect DNS messages using the DNS security credentials received from the AMF or the MME, and exchange the DNS messages over the established PDU session with the DNS server.

Accordingly, embodiments herein provide a method for integrity protection of user plane (UP) signaling messages in a wireless network. The method includes receiving integrity protection data rate capability of a user equipment (UE). Further, the method includes receiving a dedicated protocol data unit (PDU) session establishment request to establish the dedicated PDU session for exchange of the UP signalling messages. Further, the method includes establishing the dedicated PDU session with integrity protection based on the integrity protection maximum data rate capability of the UE. Further, the method includes exchanging the UP signalling message with the UE over the established dedicated PDU session with integrity protection.

In an embodiment, the dedicated PDU session establishment request is received using a data network name (DNN) configured by the operator network system.

Accordingly, embodiments herein provide a method for integrity protection of User Plane (UP) signaling messages in a wireless network. The method includes sending a dedicated protocol data unit (PDU) session establishment request for the UP signalling messages to an operator network system. Further, the method includes establishing the dedicated PDU session with the operator network system with integrity protection based on a configuration received from the operator network system. Further, the method includes exchanging the UP signaling messages over the established dedicated PDU session. The configuration, the User Plane security policy from the SMF to the gNB via the AMF, which indicates whether integrity protection to be activated or not. Based on the User Plane security policy, then the gNB perform the AS UP integrity protection and ciphering activation is done as part of the DRB addition procedure using RRC Connection Reconfiguration procedure.

In an embodiment, the dedicated PDU session establishment request is sent by the UE using a data network name (DNN) configured by the operator network system.

In an embodiment, the UE decides to exchange the UP signaling messages over the established dedicated PDU session based on at least one of an application layer protocol, a transport layer port numbers, a destination internet protocol (IP) address, a source IP address, an IP domain, a traffic flow template (TFT) parameters, an indication from higher layers, an application identifier, a traffic filtering information, and an uplink classifier.

In an embodiment, establishing the dedicated PDU session with the operator network system with the integrity protection based on the integrity protection maximum data rate capability of the UE includes indicating the integrity protection capability of the UE to the operator network system, initiating the dedicated PDU session establishment procedure with the operator network system, and establishing the dedicated PDU session with integrity protection based on the configuration received from the operator network system.

Accordingly, embodiments herein provide a method for integrity protection of user plane (UP) signaling messages in a wireless network. The method includes determining the UP signalling message has to be sent using a control plane (CP). Further, the method includes exchanging the UP signalling message over a non-access-stratum (NAS) to confirm the integrity protection.

Accordingly, embodiments herein provide a method for integrity protection of user plane (UP) signaling messages in a wireless network. The method includes determining whether a user equipment (UE) supports integrity protection data rate capability (based on the Integrity Protection Maximum Data Rate). Further, the method includes performing one of exchanging the UP signalling message with an operator network system over a dedicated protocol data unit (PDU) session with integrity protection in response to determining that the UE supports the integrity protection data rate capability, and exchanging the UP signalling message over a non-access-stratum (NAS) to confirm the integrity protection in response to determining that the UE does not support the integrity protection data rate capability.

In an embodiment, exchanging the UP signalling message with the operator network system over the dedicated PDU session with integrity protection includes sending the dedicated PDU session establishment request for the UP signalling messages to the operator network system, establishing the dedicated PDU session with the operator network system with integrity protection based on the configuration received from the operator network system, and exchanging the UP signaling messages over the established dedicated PDU session.

In an embodiment, the dedicated PDU session establishment request is sent by the UE using a data network name (DNN) configured by the operator network system.

In an embodiment, exchanging the UP signalling message over the NAS to confirm the integrity protection includes determining that the UP signalling message has to be sent using a control plane (CP), and exchanging the UP signalling message over the NAS to confirm the data integrity.

Accordingly, embodiments herein provide a method for integrity protection of user plane (UP) signaling messages in a wireless network. The method includes receiving a registration or attach request from a user equipment (UE). Further, the method includes providing domain name system (DNS) security credentials to the UE as part of registration or attach procedure. Further, the method includes exchanging protected DNS protocol messages with a DNS server using the DNS security credentials provided by an operator network system over the user plane.

Accordingly, embodiments herein provide a method for integrity protection of User Plane (UP) signaling messages in a wireless network. The method includes sending an attach or registration request to an access and mobility management function (AMF) or a mobility management entity (MME). Further, the method includes receiving domain name system (DNS) security credentials from the MME or AMF as part of registration or attach procedure. Further, the method includes protecting DNS messages using the DNS security credentials received from the AMF or the MME. Further, the method includes exchanging the DNS messages over an established PDU session with the DNS server.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

Accordingly, embodiments herein provide a method for integrity protection of user plane (UP) signaling messages in a wireless network. The method includes receiving integrity protection data rate capability of a user equipment (UE). Further, the method includes receiving a dedicated protocol data unit (PDU) session establishment request to establish the dedicated PDU session for exchange of the UP signalling messages. Further, the method includes establishing the dedicated PDU session with integrity protection based on the integrity protection maximum data rate capability of the UE. Further, the method includes exchanging the UP signalling message with the UE over the established dedicated PDU session with integrity protection.

BRIEF DESCRIPTION OF THE DRAWINGS

This method is illustrated in the accompanying drawings, throughout which like reference letters indicate corresponding parts in the various figures. The embodiments herein will be better understood from the following description with reference to the drawings, in which:

FIG. 1 is an example illustration in which a user data is encrypted without providing integrity protection, according to a prior art disclosed herein;

FIG. 2A illustrates a block diagram of an operator network system for integrity protection of user plane (UP) signaling messages in a wireless network, according to an embodiment as disclosed herein;

FIG. 2B illustrates a block diagram of a processor of the operator network system for integrity protection of the UP signaling messages in the wireless network, according to an embodiment as disclosed herein;

FIG. 3A illustrates a block diagram of a user equipment (UE) for integrity protection of the UP signaling messages in the wireless network, according to an embodiment as disclosed herein;

FIG. 3B illustrates a block diagram of a processor of the UE for integrity protection of the UP signaling messages in the wireless network, according to an embodiment as disclosed herein;

FIG. 4A is a flow diagram illustrating a method for exchanging the UP signalling message with the UE over an established dedicated protocol data unit (PDU) session by the operator network system, according to an embodiment as disclosed herein;

FIG. 4B is a flow diagram illustrating a method for exchanging the UP signalling message with the operator network system over the established dedicated PDU session by the UE, according to an embodiment as disclosed herein;

FIG. 4C is a flow diagram illustrating a method for establishing the dedicated PDU session with the operator network system with the integrity protection based on the integrity protection data rate capability of the UE, according to an embodiment as disclosed herein;

FIG. 4D is a sequence diagram illustrating a method for the UP signaling protection using the dedicated PDU session/dedicated radio bearer (DRB) in fifth-generation system (5GS), according to an embodiment as disclosed herein;

FIG. 4E is a sequence diagram illustrating a method for the UP signaling protection using the dedicated PDU session/dedicated radio bearer (DRB) in 3rd generation partnership project (3GPP), according to an embodiment as disclosed herein;

FIG. 5A is a flow diagram illustrating a method for exchanging the UP signalling message over a non-access-stratum (NAS) to confirm the integrity protection, according to an embodiment as disclosed herein;

FIG. 5B is a flow diagram illustrating a method for exchanging the UP signalling message over the PDU session or the NAS based on the integrity protection data rate capability of the UE, according to an embodiment as disclosed herein;

FIG. 5C is a sequence diagram illustrating an alternative method for the UP signaling protection using the NAS control plane in long-term evolution (LTE), according to an embodiment as disclosed herein;

FIG. 6A is a flow diagram illustrating a method for exchanging protected domain name system (DNS) protocol messages with a DNS server using DNS security credentials provided by the operator network system, according to an embodiment as disclosed herein;

FIG. 6B is a flow diagram illustrating a method for exchanging the DNS messages over the established PDU session with the DNS server by the UE, according to an embodiment as disclosed herein;

FIG. 6C is a sequence diagram illustrating a method for the UP signaling protection using the NAS configuration, according to an embodiment as disclosed herein; and FIG. 7 is a sequence diagram illustrates a method for the UP protection using a radio resource control (RRC) protocol, according to an embodiment as disclosed herein.

DETAILED DESCRIPTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein. The terms "Integrity Protection Maximum Data Rate" and "integrity protection data rate capability" means the same and used interchangeably throughout the document. "Integrity Protection Maximum Data Rate" or "integrity protection data rate capability" indicates the data rate the UE can support with integrity protection for the user plane traffic.

As is traditional in the field, embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hardwired circuits, or the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the invention. Likewise, the blocks of the embodiments may be physically combined into more complex blocks without departing from the scope of the invention The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Accordingly, embodiments herein provide a method for integrity protection of User Plane (UP) signaling messages in a wireless network. The method includes receiving Integrity Protection Maximum Data Rate capability of a user equipment (UE). Further, the method includes receiving a dedicated Protocol Data Unit (PDU) session establishment request to establish the dedicated PDU session for exchange of the UP signalling messages. Further, the method includes establishing the dedicated PDU session with integrity protection based on the integrity protection data rate capability of the UE. Further, the method includes exchanging the UP signalling message with the UE over the established dedicated PDU session.

Referring now to the drawings, and more particularly to FIGS. 1 through 7, there are shown preferred embodiments.

FIG. 1 is an example illustration in which a user data is encrypted without providing protection, according to a prior art disclosed herein.

Consider a pre-condition for the setup is, an attacker sets up a malicious relay (MITM—a man-in-the-middle attack) to which a user equipment (UE) is connected. Further, the relay impersonates an evolved node B (eNB) to the legitimate UE and impersonates the UE to the legitimate eNB. Further, the UE authenticated by a commercial network (CN), during authentication time the replay act as a passive and create a malicious Domain Name System (DNS) server.

At step 102-104, the UE sends a DNS request to a packet data network (PDN) (i.e. opens the browser and types a URL). The DNS request message is encapsulated in a user datagram protocol/internet protocol (UDP/IP) packet which is encrypted using advanced encryption standard counter mode (AES-CTR). Further, the IP header contains a legitimate IP address as a destination. At step 106, the DNS request message is sniffed by the MITM and applies manipulation mask to change the original destination IP to the address of the malicious DNS server. Further, the MITM forwards the DNS request to the network, where the address is decrypted and forwarded to the malicious DNS server. At step 108-112, the similar manipulation mask is applied to responses (from the network intended to the UE) by the MITM to ensure that a source IP address matches the target of the outgoing packet.

FIG. 2A illustrates a block diagram of an operator network system (200) for integrity protection of user plane (UP) signaling messages in a wireless network, according to an embodiment as disclosed herein. The operator network system (200) can be, for example, but not limited to a evolved node B (eNB)/a next-generation radio access technology network (gNB) (201), an access and mobility management function (AMF)/a session management function (SMF) (202), a mobility management entity (MME) (206), a user plane function (UPF) (203), a domain name system (DNS) (204), and an application server (205).

In an embodiment, the operator network system (200) includes a memory (210), a processor (220), and a communicator (230).

The memory (210) also stores instructions to be executed by the processor (220). The memory (210) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (210) may, in some examples, be considered a non-transitory storage medium. The term "non-transitory" may indicate that the storage medium is not embodied in a carrier wave or a propagated signal. However, the term "non-transitory" should not be interpreted that the memory (210) is non-movable. In some examples, the memory (210) can be configured to store larger amounts of information than the memory. In certain examples, a non-transitory storage medium may store data that can, over time, change (e.g., in Random Access Memory (RAM) or cache).

The processor (220) communicates with the memory (210), and the communicator (230). In an embodiment, the memory (210) can be an internal storage unit or it can be an external storage unit of the operator network system (200), a cloud storage, or any other type of external storage. The processor (220) is configured to execute instructions stored in the memory (210) and to perform various processes.

In an embodiment, the processor (220) is configured to receive data rate capability of a user equipment (UE) (300). Further, the processor (220) is configured to receive a dedicated protocol data unit (PDU) session establishment request to establish the dedicated PDU session for exchange of the UP signalling messages. Further, the processor (220) is configured to establish the dedicated PDU session with integrity protection based on the integrity protection data rate capability of the UE (300). Further, the processor (220) is configured to exchange the UP signalling message with the UE (300) over the established dedicated PDU session.

The processor (220) is configured to receive a registration or attach request from the UE (300). Further, the processor (220) is configured to provide DNS security credentials to the UE (300) as part of the registration or attach procedure.

The communicator (230) is configured for communicating internally between internal hardware components and with external devices via one or more networks.

Although the FIG. 2A shows various hardware components of the operator network system (200) but it is to be understood that other embodiments are not limited thereon. In other embodiments, the operator network system (200) may include less or more number of components. Further, the labels or names of the components are used only for illustrative purpose and does not limit the scope of the invention. One or more components can be combined together to perform same or substantially similar function for integrity protection of the UP signaling messages in the wireless network.

FIG. 2B illustrates a block diagram of the processor (220) of the operator network system (200) for integrity protection of the UP signaling messages in the wireless network, according to an embodiment as disclosed herein. In an embodiment, the processor (220) includes a dedicated PDU engine (221), a UP signalling controller (222), and a DNS security credential engine (223).

The dedicated PDU engine (221) receives the dedicated PDU session establishment request to establish the dedicated PDU session for exchange of the UP signalling messages. Further, the dedicated PDU engine (221) establish the dedicated PDU session with integrity protection based on the integrity protection data rate capability of the UE (300).

The UP signalling controller (222) receives data rate capability of the UE (300). Further, the UP signalling controller (222) exchange the UP signalling message with the UE (300) over the established dedicated PDU session. Further, the UP signalling controller (222) receives the registration or attach request from the UE (300). The DNS security credential engine (223) provides DNS security credentials to the UE (300) as part of the registration or attach procedure.

FIG. 3A illustrates a block diagram of the UE (300) for integrity protection of the UP signaling messages in the wireless network, according to an embodiment as disclosed herein. The UE (300) can be, for example, but not limited to a smartphone, a cellular phone, a wireless telephone, a digital telephone, a laptop, a desktop, a smart TV or a like.

In an embodiment, the UE (300) includes a memory (310), a processor (320), and a communicator (330).

The memory (310) also stores instructions to be executed by the processor (320). The memory (310) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (310) may, in some examples, be considered a non-transitory storage medium. The term "non-transitory" may indicate that the storage medium is not embodied in a carrier wave or a propagated signal. However, the term "non-transitory" should not be interpreted that the memory (310) is non-movable. In some examples, the memory (310) can be configured to store larger amounts of information than the memory. In certain examples, a non-transitory storage medium may store data that can, over time, change (e.g., in Random Access Memory (RAM) or cache).

The processor (320) communicates with the memory (310), and the communicator (330). In an embodiment, the memory (310) can be an internal storage unit or it can be an external storage unit of the UE (300), a cloud storage, or any other type of external storage. The processor (320) is configured to execute instructions stored in the memory (310) and to perform various processes.

In an embodiment, the processor (320) is configured to send the dedicated PDU session establishment request for the UP signalling messages to the operator network system (200). Further, the processor (320) is configured to establish the dedicated PDU session with the operator network system (200) with integrity protection based on the configuration received from the operator network system (200). Further, the processor (320) is configured to exchange the UP signaling messages over the established dedicated PDU session. Further, the processor (320) is configured to indicate the integrity protection capability of the UE (300) to the operator network system (200). Further, the processor (320) is configured to initiate the dedicated PDU session establishment procedure with the operator network system (200). Further, the processor (320) is configured to establish the dedicated PDU session with integrity protection based on the configuration received from the operator network system (200).

The processor (320) is configured to determine the UP signalling message has to be sent using a control plane (CP). Further, the processor (320) is configured to exchange the UP signalling message over a Non-Access-Stratum (NAS) to confirm the integrity protection.

The processor (320) is configured to determine whether the UE (300) supports integrity protection data rate capability. Further, the processor (320) is configured to perform one of exchange the UP signalling message with the operator network system (200) over the dedicated PDU session with integrity protection in response to determining that the UE (300) supports the integrity protection data rate capability, and exchange the UP signalling message over the NAS to confirm the integrity protection in response to determining that the UE (300) does not support the integrity protection data rate capability.

The processor (320) is configured to send attach or registration request to an access and mobility management function (AMF) (202) or a mobility management entity (MME) (206). Further, the processor (320) is configured to receive DNS security credentials from the MME (206) or AMF (202) as part of the registration or attach procedure. Further, the processor (320) is configured to protect DNS messages using the DNS security credentials received from the AMF (202) or the MME (206). Further, the processor (320) is configured to exchange the DNS messages over the established PDU session with the DNS server (204).

The communicator (330) is configured for communicating internally between internal hardware components and with external devices via one or more networks.

Although the FIG. 3A shows various hardware components of the UE (300) but it is to be understood that other embodiments are not limited thereon. In other embodiments, the UE (300) may include less or more number of components. Further, the labels or names of the components are used only for illustrative purpose and does not limit the scope of the invention. One or more components can be combined together to perform same or substantially similar function for integrity protection of the UP signaling messages in the wireless network.

FIG. 3B illustrates a block diagram of the processor (320) of the UE (300) for integrity protection of the UP signaling messages in the wireless network, according to an embodiment as disclosed herein. In an embodiment, the processor (320) includes a dedicated PDU engine (321), a UP signalling controller (322), a data rate capability determiner (323), and a DNS security credential engine (324).

The dedicated PDU engine (321) sends the dedicated PDU session establishment request for the UP signalling messages to the operator network system (200). Further, the dedicated PDU engine (321) establishes the dedicated PDU session with the operator network system (200) with integrity protection based on the configuration received from the operator network system (200). Further, the dedicated PDU engine (321) initiates the dedicated PDU session establishment procedure with the operator network system (200). Further, the dedicated PDU engine (321) establishes the dedicated PDU session with integrity protection based on the configuration received from the operator network system (200).

The UP signalling controller (322) exchanges the UP signaling messages over the established dedicated PDU session. Further, the UP signalling controller (322) determines the UP signalling message has to be sent using the control plane (CP). Further, the UP signalling controller (322) exchanges the UP signalling message over the NAS to confirm the integrity protection. Further, the UP signalling controller (322) performs one of exchange the UP signalling message with the operator network system (200) over the dedicated PDU session with integrity protection in response to determining that the UE (300) supports the integrity protection data rate capability, and exchange the UP signalling message over the NAS to confirm the integrity protection in response to determining that the UE (300) does not support the integrity protection data rate capability. Further, the UP signalling controller (322) sends the attach or registration request to the AMF (202) or the MME (206).

The data rate capability determiner (323) indicates the integrity protection capability of the UE (300) to the operator network system (200). Further, the data rate capability determiner (323) determines whether the UE (300) supports integrity protection data rate capability.

The DNS security credential engine (324) receives DNS security credentials from the MME (206) or AMF (202) as part of the registration or attach procedure. Further, the DNS security credential engine (324) protects the DNS messages using the DNS security credentials received from the AMF (202) or the MME (206). Further, the DNS security credential engine (324) exchanges the DNS messages over the established PDU session with the DNS server (204).

FIG. 4A is a flow diagram 400A illustrating a method for exchanging the UP signalling message with the UE (300) over an established dedicated PDU session by the operator network system (200), according to an embodiment as disclosed herein. The operations (402a-408a) are performed by the operator network system (200).

At 402a, the method includes receiving data rate capability of the UE (300). At 404a, the method includes receiving the dedicated PDU session establishment request to establish the dedicated PDU session for exchange of the UP signalling messages. At 406a, the method includes establishing the dedicated PDU session with integrity protection based on the integrity protection data rate capability of the UE (300). At 408a, the method includes exchanging the UP signalling message with the UE (300) over the established dedicated PDU session.

FIG. 4B is a flow diagram 400B illustrating a method for exchanging the UP signalling message with the operator network system (200) over the established dedicated PDU session by the UE (300), according to an embodiment as disclosed herein. The operations (402b-406b) are performed by the UE (300).

At 402b, the method includes sending the dedicated PDU session establishment request for the UP signalling messages to the operator network system (200). At 404b, the method includes establishing the dedicated PDU session with the operator network system (200) with integrity protection based on the configuration received from the operator network system (200). At 406b, the method includes exchanging the UP signaling messages over the established dedicated PDU session.

FIG. 4C is a flow diagram 404b illustrating a method for establishing the dedicated PDU session with the operator network system (200) with the integrity protection based on the integrity protection data rate capability of the UE (300), according to an embodiment as disclosed herein. The operations (404ba-404bc) are performed by the UE (300).

At 404ba, the method includes indicating the integrity protection capability of the UE (300) to the operator network system (200). At 404bb, the method includes initiating the dedicated PDU session establishment procedure with the operator network system (200). At 404bc, the method includes establishing the dedicated PDU session with integrity protection based on the configuration received from the operator network system (200).

FIG. 4D is a sequence diagram illustrating a method for the UP signaling protection using the dedicated PDU session/dedicated radio bearer (DRB) in fifth-generation system (5GS), according to an embodiment as disclosed herein.

At 402d, the UE (300) initiates the registration procedure with the operator system network (200) and successfully registers with the operator system network (200). At 404d-406d the UE (300) then initiates service request procedure or PDU session establishment procedure. During the service request procedure or PDU session establishment procedure, the AMF (202) may provide the necessary the DNS server(s) (204) details (for example, DNS server IP address (es)). The DNS server (204) details are provided during the attach procedure or service request procedure or PDU session establishment procedure or pre-configured in the UE. The UE (300) initiates the PDU session establishment procedure to establish a separate DRB/PDU session exclusively for the UP signaling messages and the operator system network (200) enables integrity protection for the PDU session (the User Plane Security Enforcement information from the SMF (202) provides the NG-RAN with User Plane security policies for a PDU session, which indicates the UP integrity protection is "Required"). The operator system network (200) configures the DNN or the APN for exchange of the UP signaling messages.

At 408d-410d, whenever, the UE (300) needs to perform DNS lookup (to resolve domain names) for a PDU session, the UE (300) initiates the DNS query messages to the DNS server (204) transported over the established dedicated PDU session for UP signaling messages, which is integrity protected between the UE (300) and the gNB. Any modification/manipulation of the DNS query message is identifiable. The DNS server (204) IP address is pre-configured or provided by the operator system network (200) for the PDU session either in 402d or in 404d, as part of Protocol configuration options (PCO) information element.

Further, the UE (300) identifies/decides to send particular IP packet (UP signaling messages) over the established dedicated PDU session, based on at least one of: application layer protocol (for example: DNS), Transport layer port numbers, destination IP address, source IP address, IP domain, TFT parameters, indication from higher layers (for example, radio interface layer), application identifier, traffic filtering information, uplink classifier (UL CL), if the integrity protection is not enabled for the PDU session, if the integrity protection is not enabled for the DRB, Bearer ID, evolved packet system (EPS) Bearer ID, DRB ID, quality of service (QoS) flows, PDU Session(s) context, PDP context, EPS bearer context. In an embodiment, irrespective of the support of integrity protection support for any PDU sessions, the UE (300) always send the UP signaling messages, over the established dedicated PDU session.

Further, the DNS server (204) is an independent physical entity in the core network or outside the core network or the DNS server (204) functionality can be performed by the UPF (203) or the UPF (203) act as the DNS proxy or the DNS server (204) is co-located with the UPF (203). The UPF (203) routes the DNS query to the appropriate DNS server (204) based on the destination IP address.

At 412d-414d, when the UE (300) receives the DNS response based on the initiated DNS query, the UE (300) verifies the message authentication code-integrity (MAC-I) included (by the gNB/eNB) (201) along with the message to confirm the data integrity, as the DRB is configured for integrity protection. The MAC-I is derived using the AS security context established during the PDU session establishment procedure.

The above procedure is applicable for EPS (LTE) also, wherein the functions provided by the AMF/SMF (202) are provided by the MME (206), the gNB is the eNB (201) and the UPF (203) is the packet data network gateway (PGW).

DNS request means DNS query and DNS response means either DNS answer or DNS referral or DNS reply. The user plane signaling messages means the signaling messages transported over user plane, for example, DNS, session initiation protocol (SIP), dynamic host configuration protocol (DHCP), Real-time Transport Control Protocol (RTCP) like so.

FIG. 4E is a sequence diagram illustrating a method for the UP signaling protection using the dedicated PDU session/dedicated radio bearer (DRB) in 3rd generation partnership project (3GPP), according to an embodiment as disclosed herein.

At 402e, the UE (300) initiates the registration procedure with the operator system network (200) and successfully registers with the operator system network (200). At 404e establish the dedicated PDU between the UE (300) and the operator system network (200). At 406e-412e, functionality is same as step 408d-414d. At 414e, the DNS server (204) exchanges PDU-1 to PDU-2 for high data rate demand by the UE (300) using the application server (205).

The operator system network (200) configures a special DNN for exchange of secure UP signalling messages. The UE (300) initiates the PDU session establishment procedure to establish a separate PDU session exclusively for the UP signalling messages and the network enables integrity protection for the PDU session (PDU #1). The User Plane Security Enforcement information from the SMF for the PDU #1 provides the NG-RAN with User Plane security policies for a PDU session, which indicates the UP integrity protection is "Required"). The UP signalling messages means, for example, DNS message exchanges over the UP, which requires integrity protection. Even though the integrity protection of a PDU session (PDU #2) is not activated due to the UE (300) capability limitations or serving network policy for the PDU session, protection of sensitive protocol message (for example, DNS exchanges) for the PDU #2 is achieved by exchanging the UP signalling messages of PDU #2 using the dedicated PDU sessions (PDU #1) which serves low data rate signalling exchanges.

The UE (300) identifies/decides to send particular IP packet (UP signalling messages) over the established PDU session, based on at least one of the following traffic filtering information: application layer protocol (for example: DNS), transport layer port numbers, destination IP address and/or source IP address.

FIG. 5A is a flow diagram 500A illustrating a method for exchanging the UP signalling message over the NAS to confirm the integrity protection, according to an embodiment as disclosed herein. The operations (502a-504a) are performed by the UE (300).

At 502a, the method includes determining the UP signalling message has to be sent using the CP. At 504a, the method includes exchanging the UP signalling message over the NAS to confirm the integrity protection.

FIG. 5B is a flow diagram 500B illustrating a method for exchanging the UP signalling message over the PDU session or the NAS based on the integrity protection data rate capability of the UE (300), according to an embodiment as disclosed herein. The operations (502a-504a) are performed by the UE (300).

At 502b, the method includes determining whether the UE (300) supports integrity protection data rate capability and the operator network system (200) enabled UP integrity protection for the PDU session. At 504ba, the method includes exchanging the UP signalling message with the operator network system (200) over the dedicated PDU session with integrity protection in response to determining that the UE (300) supports the integrity protection data rate capability. At 504bb, the method includes exchanging the UP signalling message over the NAS to confirm the integrity protection in response to determining that the UE (300) does not support the integrity protection data rate capability.

FIG. 5C is a sequence diagram illustrating an alternative method for the UP signaling protection using the NAS control plane in long-term evolution (LTE), according to an embodiment as disclosed herein.

At 502c, the UE (300) initiates the attach procedure with the operator network system (200) and successfully attach with the operator network system (200). At 504c, the UE (300) then initiates service request procedure. During the service request procedure or PDU session establishment procedure, the MME (206) provides the necessary the DNS server(s) (204) details (for example, DNS server (204) IP address (es)). The DNS server (204) details are provided during the Attach procedure or Service Request procedure or PDU session establishment procedure.

At 506c, the UE (300) identifies/decides to send the IP packet transport over the NAS PDU, even though the UE (300) is in not in ECM-Idle, based on at least one of: application layer protocol (for example: DNS), Transport layer port numbers, source IP address, destination IP address, IP domain, TFT parameters, indication from higher layers (for example, Radio Interface Layer), application identifier, traffic filtering information, Uplink Classifier (UL CL), if the integrity protection is not enabled for the PDU session, if the integrity protection is not enabled for the DRB, Bearer ID, EPS Bearer ID, DRB ID, QoS Flows, PDU Session(s) context, PDP context, EPS bearer context.

At 508c-510c, whenever, the UE (300) needs to perform DNS lookup (to resolve domain names) for the PDU session, the UE (300) initiates the DNS query messages to the DNS server (204) transported over the NAS PDU (Data over NAS, for example, EPS connection management (ESM) data transport message). The UE (300) identifies/decides to send the IP packet transport over the NAS PDU based on 506c. As the NAS messages are integrity protected, any modification/manipulation of the DNS query message is identifiable. The DNS server (204) IP address is configured by the network for the PDU session in 504c.

The DNS server (204) functionality can be performed by the MME (206) or the MME (206) act as the DNS proxy or the DNS server (204) is co-located with the MME (206) or the DNS server (204) is an independent physical entity in the core network or outside the core network or the DNS server (204) functionality can be performed by the AMF (202) or the AMF (202) act as the DNS proxy or the DNS server (204) is co-located with the AMF (202). The MME (206) routes the DNS query to the appropriate DNS server (204) based on the destination IP address.

At 512c-514c, when the UE (300) receives the DNS response based on the initiated DNS query, the UE (300) verifies the MAC-I included (by the MME (206)/AMF (202)) along with the message to confirm the data integrity. The MAC-I is derived using the NAS security established during the Attach/Registration procedure.

The above procedure is applicable for 5GS (5G) also, wherein the functions provided by the MME (206) is provided by the AMF/SMF (202) and the eNB (201) is the gNB.

FIG. 6A is a flow diagram 600A illustrating a method for exchanging protected domain name system (DNS) protocol messages with the DNS server (204) using DNS security credentials provided by the operator network system (200), according to an embodiment as disclosed herein.

At 602a, the method includes receiving the registration or attach or service or PDU session establishment request from the UE (300). At 604a, the method includes providing DNS security credentials to the UE (300) as part of the registration or attach or service request or PDU establishment procedure (may be using the Protocol Configuration Option (PCO) IE). At 606a, the method includes exchanging the protected DNS protocol messages with the DNS server (204) using the DNS security credentials provided by the operator network system (200).

FIG. 6B is a flow diagram 600B illustrating a method for exchanging the DNS messages over the established PDU session with the DNS server (204) by the UE (300), according to an embodiment as disclosed herein.

At 602b, the method includes sending the attach or registration or service or PDU session establishment request to the AMF (202) or the MME (206). At 604b, the method includes receiving DNS security credentials from the MME (206) or AMF (202) as part of the registration or attach or service or PDU session establishment procedure (for example, using the PCO IE). At 606b, the method includes protecting the DNS messages using the DNS security credentials received from the AMF (202) or the MME (206). At 608b, the method includes exchanging the DNS messages over the established PDU session with the DNS server (204).

FIG. 6C is a sequence diagram illustrating a method for the UP signaling protection using the NAS configuration, according to an embodiment as disclosed herein.

At 602c, the UE (300) initiates the registration procedure with the operator network system (200) and successfully registers with the operator network system (200). At 604c, the UE (300) then initiates service request procedure or PDU session establishment procedure. During the service request procedure or PDU session establishment procedure, the AMF (202) provides the necessary credentials for the UP signaling message protection, along with the DNS server(s) (204) details (for example, DNS server (204) IP address(es)). For illustrative purpose, in case of the DNS query and response messages, the public key of the DNS server (204) is provided to the UE (300), so that the UE (300) verifies the digital signature in the DNS answer message, as to confirm that the response is from the intended destination and the response is not modified.

At 606c-608c, whenever, the UE (300) needs to perform DNS lookup (to resolve domain names) for the PDU session, the UE (300) initiates the DNS query messages to the DNS server (204). The DNS server (204) IP address is configured by the network for the PDU session in 604c. The DNS server (204) is an independent physical entity in the core network or outside the core network or the DNS server (204) functionality can be performed by the UPF (203) or the UPF (203) act as the DNS proxy or the DNS server (204) is co-located with the UPF (203). The UPF (203) routes the DNS query to the appropriate DNS server (204) based on the destination IP address in the DNS query message.

At 610c, when the UE (300) receives the DNS answer based on the initiated DNS query, the UE (300) verifies the digital signature received along with the messages to confirm the data integrity and data origin authentication. The credentials required for the digital signature are provided by the operator network system (200) in the 604c.

In an embodiment, the proposed method is applicable for EPS (LTE) also, wherein the functions provided by the AMF/SMF (202) are provided by the MME (206), the gNB is the eNB (201) and the UPF (203) is the PGW.

FIG. 7 is a sequence diagram illustrates a method for the UP protection using a radio resource control (RRC) protocol, according to an embodiment as disclosed herein.

The method considers the integrity protection of the DNS message exchanges, which are exchanged over the control plane or over the user plane in the 5G system. In the proposed method, the gNB host the DNS server (204) and provides the DNS lookup service as mobile edge computing service (MEC) i.e., the PDU session for the user plane signaling services are terminated at the mobile network edge. These mobile edge services are accessed by the UE (300) either using the RRC signaling or using the user plane terminating at the mobile network edge.

At 702-704, whenever, the UE (300) needs to perform DNS lookup (to resolve domain names) for the PDU session (for example from an Edge Accelerated Browser), the UE (300) initiates the DNS query messages to the DNS server (204) transported over the RRC (as RRC signaling message or as RRC PDU), which is integrity protected between the UE (300) and the gNB. Any modification/manipulation of the DNS query message is identifiable by the gNB.

The DNS server (204) IP address is the gNB IP address. The DNS protocol PDU (DNS query and DNS answer) are transported by the RRC layer or by the packet data convergence protocol (PDCP) layer between the gNB and the UE (300) (for example over SRB), without IP and TCP/UDP headers. Which means, the UE (300) query the gNB for the DNS lookups directly (for example, using the gNB identity).

The DNS server (204) details are provided to the UE (300) during the attach procedure or service request procedure or PDU session establishment procedure. The DNS server (204) is an independent physical entity in the Radio network or the DNS server (204) functionality can be performed by the gNB or the gNB act as the DNS proxy or the DNS server (204) is co-located with the gNB. The gNB routes the DNS query to the appropriate DNS server (204) based on the destination IP address or gNB ID.

The UE (300) identifies/decides to send particular IP packet (UP signaling messages) over the RRC signaling or PDU or over PDCP, based on at least one of: application programming interfaces (API) service discovery and based on the discovery the UE (300) decides to use the PDU/PDN which terminates at the MEC, application layer protocol (for example DNS), Transport layer port numbers, destination IP address, source IP address, IP domain, TFT parameters, indication from higher layers (for example, radio interface layer), application identifier, traffic filtering information, uplink classifier (UL CL), if the integrity protection is not enabled for the PDU session, if the integrity protection is not enabled for the DRB, Bearer ID, EPS Bearer ID, DRB ID, QoS flows, PDU Session(s) context, PDP context, EPS bearer context.

At 706-708, when the UE (300) receives the DNS response based on the initiated DNS query, the UE (300) verifies the MAC-I included (by the gNB/eNB) (201) along with the message to confirm the data integrity. The MAC-I is derived using the AS security established during the PDU session establishment procedure.

At 710-712, alternative to the 702-704, whenever the UE (300) needs to perform DNS lookup (to resolve domain names) for the PDU session, the UE (300) initiates the DNS query messages to the DNS server (204) transported over the PDU session established for the service (UP signaling), which is integrity protected between the UE (300) and the gNB. Any modification/manipulation of the DNS Query message is identifiable by the gNB.

The DNS server (204) details are provided to the UE (300) during the attach procedure or service request procedure or PDU session establishment procedure. The DNS server (204) is an independent physical entity in the Radio network or the DNS server (204) functionality can be performed by the gNB or the gNB act as the DNS proxy or the DNS server (204) is co-located with the gNB. The gNB routes the DNS query to the appropriate DNS server (204) based on the destination IP address.

The UE (300) identifies/decides to send particular IP packet (UP signaling messages) over the established PDU session, based on at least one of: API service discover and based on the service discovery the UE (300) decides to use the mobile edge service (MEC), application layer protocol (for example: DNS), Transport layer port numbers, destination IP address, source IP address, IP domain, TFT parameters, indication from higher layers (for example, radio interface layer), application identifier, traffic filtering information, uplink classifier (UL CL), if the integrity protection is not enabled for the PDU session, if the integrity protection is not enabled for the DRB, Bearer ID, EPS Bearer ID, DRB ID, QoS Flows, PDU Session(s) context, PDP context, EPS bearer context.

At 714-716, an alternative to the 706-708, when the UE (300) receives the DNS response based on the initiated DNS query, the UE (300) verifies the MAC-I included (by the gNB/eNB) (201) along with the message to confirm the data integrity. The MAC-I is derived using the AS security established during the PDU session establishment procedure.

The above procedure is applicable for EPS (LTE) also, wherein the functions provided by the AMF/SMF (202) is provided by the MME (206), the gNB is the eNB (201) and the UPF (203) is the PGW.

Further, with respect to all the above methods for protecting user plane signaling messages, the below are applicable: if the UE (300) is not successful in getting the response when using NAS PDU, RRC PDU, special PDU session, then the UE (300) will try the existing mechanism of sending the DNS query over the user plane. This is to mitigate the distributed denial of service (DDoS) attack on the network entity.

The network may configure the above-specified security mechanism for the primary DNS server (204) and may not be for the secondary DNS server (204). So that DDoS attack is mitigated or to have an alternative to prevent service disruption. The network configures the traffic filters or QoS flow for the UE (300) during at least one of the following procedures: registration procedure or attach procedure or service request procedure or PDU session establishment procedure or separate new NAS procedure. The traffic filter is at least one of the application layer protocol (for example: DNS), Transport layer port numbers, destination IP address, source IP address, IP domain, TFT parameters, indication from higher layers (for example, radio interface layer), application identifier, traffic filtering information, uplink classifier (UL CL), if the integrity protection is not enabled for the PDU session, if the integrity protection is not enabled for the DRB, PDU Session(s) context, PDP context, EPS bearer context.

The network configures a separate DNN or APN, for the establishment of a dedicated PDU or PDN session or QoS flow to carry the UP signaling messages. Further, it is also possible to have a combination of any two or more specified alternatives.

The embodiments disclosed herein can be implemented using at least one software program running on at least one hardware device and performing network management functions to control the elements.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A method for operating a user equipment (UE) in a wireless communication system, the method comprising:
   transmitting, to a session management function (SMF), a dedicated Protocol Data Unit (PDU) session establishment request including information on a maximum data rate of the UE for transmitting user plane (UP) signaling messages;
   in response to the dedicated PDU session establishment request, receiving a configuration information for establishing the dedicated PDU session from the SMF;
   establishing the dedicated PDU session based on the configuration information;
   in case that the UE supports an integrity protection for the maximum data rate of the UE, exchanging the UP signaling messages with a domain name system (DNS) server over the established dedicated PDU session; and
   in case that the UE does not support the integrity protection for the maximum data rate of the UE, determining that the UP signaling message have to be sent using a control plane (CP) and exchanging the UP signaling message with the DNS server over a non-access-stratum (NAS).

2. The method of claim 1,
   wherein the PDU session establishment request is transmitted using a data network name (DNN) configured by the SMF.

3. The method of claim 1, further comprising:
   transmitting, to an access and mobility management function (AMF), a request for an attach or a registration;
   receiving, from the AMF, DNS security credentials in response to the request for the attach or the registration; and
   exchanging protected DNS protocol messages with the DNS server using the DNS security credentials provided by the AMF over a user plane.

4. A method performed by an operator network system in a wireless communication system, the method comprising:
   receiving, from a user equipment (UE), a dedicated Protocol Data Unit (PDU) session establishment request including information on a maximum data rate of the UE for transmitting user plane (UP) signaling messages, by a session management function (SMF);
   in response to the dedicated PDU session establishment request, transmitting, by the SMF, a configuration information for establishing the dedicated PDU session to the UE;
   establishing, by the SMF, the dedicated PDU session based on the maximum data rate of the UE;
   in case that the UE supports an integrity protection for the maximum data rate of the UE, exchanging by a domain name system (DNS) server, the UP signaling messages with the UE over the established dedicated PDU session with integrity protection; and
   in case that the UE does not support the integrity protection for the maximum data rate of the UE, exchanging, by the DNS server, the UP signaling message with the UE over a non-access-stratum, NAS, to confirm the integrity protection, wherein the UP signaling message have to be sent using a control plane (CP) by the UE and wherein the operator network system includes at least one of the SMF, an access and mobility management function (AMF), or the DNS server.

5. The method of claim 4,
wherein the PDU session establishment request is received using a data network name (DNN) configured by the SMF.

6. The method of claim 4, further comprising:
receiving, from the UE, a request for an attach or a registration, by the AMF;
transmitting, to the UE, DNS security credentials in response to the request for the attach or the registration, by the AMF; and
exchanging protected DNS protocol messages with the DNS server using the DNS security credentials provided by the AMF over a user plane.

7. A user equipment (UE) in a wireless communication system, the UE comprising:
a transceiver; and
at least one processor operably coupled to the transceiver, and configured to:
transmit, to a session management function (SMF), a dedicated Protocol Data Unit (PDU) session establishment request including information on a maximum data rate of the UE for transmitting user plane (UP) signaling messages;
in response to the dedicated PDU session establishment request, receive a configuration information for establishing the dedicated PDU session from the SMF;
establish the dedicated PDU session based on the configuration information; and
in case that the UE supports an integrity protection for the maximum data rate of the UE, exchange the UP signaling messages with a domain name system (DNS) server over the established dedicated PDU session; and
in case that the UE does not support the integrity protection for the maximum data rate of the UE, determine that the UP signaling message have to be sent using a control plane (CP) and exchange the UP signaling message with the DNS server over a non-access-stratum (NAS).

8. The UE of claim 7,
wherein the PDU session establishment request is transmitted using a data network name (DNN) configured by the SMF.

9. The UE of claim 7, wherein the processor is further configured to:
transmit, to an access and mobility management function (AMF), a request for an attach or a registration;
receive, from the AMF, DNS security credentials in response to the request for the attach or the registration; and
exchange protected DNS protocol messages with the DNS server using the DNS security credentials provided by the AMF over a user plane.

* * * * *